(12) United States Patent
Spiekermann et al.

(10) Patent No.: US 8,837,535 B2
(45) Date of Patent: Sep. 16, 2014

(54) MICROCRYSTAL LASER FOR GENERATING LASER PULSES

(75) Inventors: Stefan Spiekermann, Hannover (DE); Georg Sommerer, Berlin (DE)

(73) Assignee: Coherent Lasersystems GmbH & Co. KG, Göttingen (DE)

( * ) Notice: Subject to any disclaimer, the term of this patent is extended or adjusted under 35 U.S.C. 154(b) by 117 days.

(21) Appl. No.: 13/074,274

(22) Filed: Mar. 29, 2011

(65) Prior Publication Data

US 2011/0243158 A1    Oct. 6, 2011

(30) Foreign Application Priority Data

Mar. 31, 2010 (DE) .......................... 10 2010 013 766
Nov. 9, 2010 (DE) .......................... 10 2010 050 860

(51) Int. Cl.
*H01S 3/113* (2006.01)

(52) U.S. Cl.
USPC ............................................................ 372/11

(58) Field of Classification Search
CPC ..... H01S 3/025; H01S 3/0405; H01S 3/0627; H01S 3/1053
USPC ................................................ 372/58, 11, 21
See application file for complete search history.

(56) References Cited

U.S. PATENT DOCUMENTS

| | | | |
|---|---|---|---|
| 5,394,413 A | 2/1995 | Zayhowski | |
| 5,489,778 A | 2/1996 | Burmester et al. | |
| 5,495,494 A * | 2/1996 | Molva et al. | 372/98 |
| 5,982,802 A * | 11/1999 | Thony et al. | 372/75 |
| 6,002,704 A | 12/1999 | Freitag et al. | |
| 6,373,864 B1 | 4/2002 | Georges et al. | |
| 6,778,563 B2 | 8/2004 | Laurell et al. | |

FOREIGN PATENT DOCUMENTS

| | | |
|---|---|---|
| DE | 43 06 919 | 9/1994 |
| DE | 4306919 A1 | 9/1994 |
| JP | 2004-311719 A | 11/2004 |
| JP | 2007-214207 A | 8/2007 |

OTHER PUBLICATIONS

Zayhowski et al., "Diode-Pumped Microchip Lasers Electro-Optically Q Switched at High Pulse Repetition Rates", Optics Letters, vol. 17, No. 17, Sep. 1,1992, pp. 1201-1203.
International Search Report and Written Opinion received for PCT Patent Application No. PCT/EP2013/076260, mailed on Mar. 25, 2014, 13 pages.

* cited by examiner

*Primary Examiner* — Tuan Nguyen
(74) *Attorney, Agent, or Firm* — Morrison & Foerster LLP

(57) ABSTRACT

A microcrystal laser for generating laser pulses has a laser resonator which has a laser medium arranged between two mirrors; and an arrangement for stabilizing the optical path length is provided. The laser resonator has a saturable absorber medium for pulse generation.

5 Claims, 2 Drawing Sheets

MICROCRYSTAL LASER FOR GENERATING LASER PULSES

CROSS-REFERENCE TO RELATED APPLICATIONS

This application claims the priority of German application no. 10 2010 013 766.9, filed Mar. 31, 2010, and this application claims the priority of German application no. 10 2010 050 860.8, filed Nov. 9, 2010, and each of which is incorporated herein by reference.

The invention relates to a microcrystal laser of the type for generating laser pulses. More particularly, the invention relates to a microcrystal laser for generating laser pulses that has a laser resonator including a laser medium arranged between two mirrors.

BACKGROUND OF THE INVENTION

Different types of monofrequency microcrystal lasers are known. A feature of such lasers is the formation of one or more longitudinal modes of the light wave field in the laser resonator. The number of possible longitudinal modes is defined in this way by the optical path length of the resonator, in which case a sufficient optical path length, one mode or a plurality of modes can develop. If the optical path length of the resonator is reduced, the maximum possible number of laser modes is reduced. The smaller the optical path length becomes here, the larger is accordingly the frequency spacing between two adjacent modes. The possible oscillating modes of such a laser are the ones which are subjected to amplification. In order to be subjected to amplification, the modes must lie within the amplification bandwidth of the laser medium (laser-active medium). Accordingly, with decreasing resonator length, the number of amplified modes decreases. The number can also become zero in the case that the absolute position of the modes lies outside of the amplification bandwidth of the laser medium. With decreasing resonator length, the period and the pulse duration of the selected laser pulse decreases at the same time, and in which laser pulses with pulse durations <1 ns up to <50 ps can be obtained.

By a suitable selection of the optical path length of the laser resonator it is possible that the oscillating laser mode lies in a defined manner within the amplification bandwidth, for example in the maximum, and thus is subjected to an amplification as high as possible. Accordingly, the output power of a laser is at a maximum if the optical path length is actively adapted to the relative position of the oscillating mode in the maximum of the amplification bandwidth of the laser medium.

An amplitude fluctuation of a microcrystal laser in the uncontrolled range is approximately 6% and thus is not suited for applications which require a lower amplitude fluctuation from pulse to pulse. A stabilization of the optical path length of the resonator counteracts an amplitude fluctuation through smaller differences in the amplification by centering the position of the emission wavelength in the maximum of the amplification bandwidth of the laser medium.

From DE 43 06 919 C2, a method for stabilizing the optical path length of a resonator is known. This publication discloses a microcrystal laser of the relevant type for generating laser pulses which has a laser resonator which has a laser medium (laser-active medium) arranged between two mirrors. The known microcrystal laser further has an arrangement for stabilizing the optical path length of the laser resonator.

OBJECTS AND SUMMARY OF THE INVENTION

An object of the invention is to configure a microcrystal laser in such a manner that a monomode operation on only one laser line in the emission maximum of the amplification bandwidth of the laser medium is possible and, at the same time, short laser pulses at low amplitude fluctuations can be generated.

This object is achieved by the microcrystal laser for generating laser pulses according to the invention which includes:

a) a laser resonator including a laser medium arranged between two mirrors;

b) an arrangement being provided for stabilizing the optical path length of the laser resonator; and c) the laser resonator including a saturable absorber medium for generating pulses.

The fundamental idea of the invention is to provide a saturable absorber medium in the laser resonator. It was surprisingly found in accordance with the invention that by combining a known saturable absorber medium with a stabilization of the optical path length of the resonator, a low amplitude fluctuation at short pulse duration and a monomode operation on only one laser line in the emission maximum of the amplification bandwidth of the laser medium are possible.

Thus, the invention provides with relatively little effort a microcrystal laser, hereinafter also referred to in short as a laser, which, with respect to the generation of short pulses with little amplitude fluctuation, has particularly advantageous properties.

The arrangement for stabilizing the optical path length of the laser resonator can be configured according to the respective requirements. For example, and in particular, it is possible according to the invention to thermally stabilize the optical path length of the laser resonator. This can take place according to the invention, for example, in that the pump current and/or the amplitude of the pump light is changed so that consequently the path length of the laser resonator changes. Within a thermal stabilization of the path length of the laser resonator it is also possible to stabilize the laser resonator by cooling or heating the whole laser resonator or individual components of the laser resonator. However, according to the invention, it is also possible to mechanically stabilize the optical path length of the laser resonator by providing, for example, at least one piezoelectric actuator by use of which at least one component of the laser resonator can be displaced. According to the invention, a combination of a thermal stabilization with a mechanical stabilization is also possible.

If the laser resonator has cooling media as a heat sink, preferably $Al_2O_3$, SiC, or diamond can be used.

In principle, the saturable absorber medium can be provided at any position or in any component of the laser resonator.

An advantageous further embodiment of the invention provides in this respect that the mirror is a saturable absorber mirror which forms the saturable absorber medium. Another advantageous further embodiment of the invention provides that the laser resonator is a monolithic or semi-monolithic laser resonator.

It has been found that the favorable properties of the laser according to the invention can be further improved if the laser medium is cooled. An advantageous further embodiment of the invention provides in this respect an arrangement for dissipating heat from the laser medium.

A further embodiment of the aforementioned embodiment provides that the arrangement for dissipating heat from the laser medium has a carrier made of a material with high thermal conductivity with which the laser medium is in a thermally conductive connection. A material of high thermal conductivity is to be understood according to the invention as a material, the thermal conductivity of which is higher than the one of the laser medium, so that an efficient dissipation of heat from the laser medium and thus an efficient cooling of the laser medium is possible in a particularly simple manner.

In order to prevent or at least reduce an undesired thermal interference with the saturable absorber medium caused by heat generated in the laser medium, an advantageous further embodiment of the invention provides that the saturable absorber medium is at least partially, preferably completely, or almost completely thermally decoupled from the laser medium. In other words, the saturable absorber medium is one of partially, substantially completely, and completely decoupled from the laser medium.

An advantageous further embodiment of the aforementioned embodiment provides that for thermally decoupling the saturable absorber medium from the laser medium, the saturable absorber medium and the laser medium are spaced apart from each other. In this embodiment, an at least partial thermal decoupling of the saturable absorber medium from the laser medium is achieved in a particularly simple manner.

In the aforementioned embodiment, a thermally insulating material can be arranged between the saturable absorber medium and the laser medium, and the material is selected such that it does not or only to a minimal extent influences the optical properties of the laser resonator.

Advantageously, however, between the saturable absorber medium and the laser medium, an air gap is formed as is provided by a further embodiment of the aforementioned embodiment. In this manner, a particularly effective cooling of the saturable absorber medium is possible. The air gap in a resonator, the geometrical path length of which is ≤1,000 μm, can be approximately 10-500 μm. In case of laser resonators with a larger optical path length, the gap width of the air gap is to be selected according to the respective requirements.

Another advantageous further embodiment of the invention provides that the saturable absorber medium is arranged on a carrier element and that between the carrier element and the laser medium at least one spacer is arranged. This embodiment allows via the spacer an interference with the optical path length of the resonator. For this purpose, for example, the spacer can be configured as a piezo element.

An advantageous further embodiment of the aforementioned embodiment provides that the material of the spacer is selected with respect to its coefficient of thermal expansion such that during a temperature change of the laser resonator, the optical path length of the laser resonator changes. If, for example, the material of the spacer has a higher coefficient of thermal expansion than the material of the saturable absorber medium, the optical path length of the laser resonator increases during a temperature increase.

Another advantageous further embodiment of the invention provides a control device for controlling the optical path length of the laser resonator, in particular as a function of the output power of the microcrystal laser and/or the pulse repetition rate and/or the wavelength of the laser mode. The laser can be pumped, for example, by a diode laser, the pump light of which, for example, is coupled into the laser via a telescope. A portion of the generated laser radiation can be directed via a beam splitter onto a photodiode which generates a signal which is proportional to the output power of the laser. This signal can be converted in a controller into an actuating variable which influences the optical path length of the laser resonator as controlled variable. Here, for example, the current of the pump diode, the temperature of the pump diode, the temperature of the laser, the voltage at a piezo element which serves as spacer between the saturable absorber medium and the laser, and other parameters can serve as actuating variables.

According to the respective requirements, the geometrical length of the laser resonator, and therefore the optical path length of the same, is selectable within wide limits. An advantageous further embodiment of the invention provides in this respect that the geometrical path length of the laser resonator is ≤1,000 μm, in particular ≤500 μm.

In order to prevent that pump light enters into the saturable absorber medium and causes in particular a heating of the same, another advantageous further embodiment of the invention provides that the laser medium, on its side facing the saturable absorber medium, and/or the saturable absorber medium, on its side facing the laser medium, has a coating for reflecting the pump light back into the laser medium.

The invention is illustrated in more detail hereinafter by use of the attached drawing in which greatly schematized embodiments of a laser according to the invention are illustrated. Here, all features described, illustrated in the drawing and claimed in the patent claims, individually or in any combination with each other, form the subject matter of the invention independent of their combination in the patent claims and their relations and independent of their description or illustration in the drawing.

DETAILED DESCRIPTION OF THE INVENTION

Figure 1:
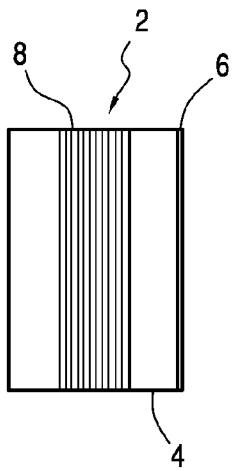
FIG. 1 shows a greatly schematized side view of a first embodiment of a laser according to the invention.

In the figures of the drawing, identical or corresponding components are indicated with identical reference numerals.

In FIG. 1, a greatly schematized side view of a laser resonator 2 of a laser according to the invention is illustrated which has a laser medium (laser-active medium) 4 which is formed in this embodiment by a laser crystal Nd:YVO$_4$. The laser medium 4 is arranged between two mirrors, in which the one mirror 6 in this embodiment is formed by a partly reflective outcoupling coating. According to the invention, the laser resonator 2 has a saturable absorber medium which is formed in this embodiment by a saturable absorber mirror 8. The embodiment illustrated in FIG. 1 relates to a monolithic structure, in which the resonator mirrors 6, 8 are provided on plane-parallel surfaces of the laser medium 4.

The saturable absorber medium can be operated (e.g., driven) in reflection as well as in transmission. It can consist, for example, of a semiconductor material, for example gallium arsenide (GaAs), or a doped crystal, for example Cr:YAG.

Figure 2:
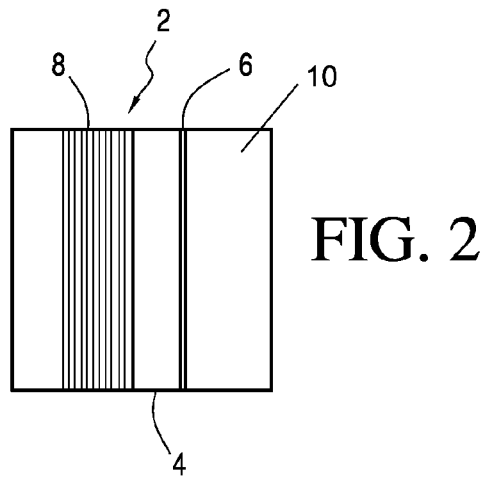
FIG. 2 shows, in the same manner as FIG. 1, a second embodiment of a laser according to the invention.

In FIG. 2, a second embodiment of a laser resonator 2 according to the invention (hereinafter also referred to in short as resonator 2) is illustrated which differs from the embodiment according to FIG. 1 in that an arrangement or element for dissipating heat from the laser medium 4 is provided. In this embodiment, the arrangement is formed by a carrier 10 which is connected to the mirror 6 and thus is in a thermally conductive connection with the laser medium. The carrier 10 consists of a material with a high thermal conductivity so that an efficient dissipation of heat from the laser medium 4 is achieved. As is apparent from FIG. 2, the carrier 10 in this embodiment is arranged outside of the resonator 2. Due to the heat dissipation from the laser medium 4 via the carrier 10, a heating of the laser medium 4 and the saturable absorber mirror 8 is reduced during the operation of the laser medium 4.

Figure 3:
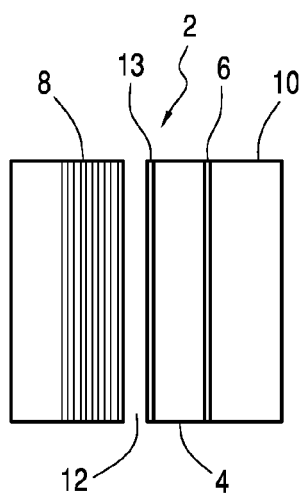
FIG. 3 shows, in the same manner as FIG. 1, a third embodiment of a laser according to the invention.

In FIG. 3, a third embodiment of a resonator 2 according to the invention is illustrated which differs from the embodiment according to FIG. 2 in that the saturable absorber mirror 8 is at least partially thermally decoupled from the laser medium 4. In the illustrated embodiment, an air gap 12 is formed between the saturable absorber mirror 8 and the laser medium 4 for decoupling the saturable absorber mirror 8 from the laser medium 4. In this manner, a direct heat transfer from the laser medium 4 to the saturable absorber medium (saturable absorber mirror 8) is prevented.

In this manner, an effective cooling of the saturable absorber medium is achieved or made possible so that the life span of the saturable absorber medium is increased. If the optical path length of the laser resonator 2 is for example ≤1,000 μm, the air gap 12 can have a gap width of 10 to 500 μm. In order to prevent that the pump light used for pumping the laser medium 4 radiates into the saturable absorber medium, the laser medium 4 in the embodiment according to FIG. 3 has a coating 13 on its side facing the absorber medium for reflecting the pump light back into the laser medium 4.

What the embodiments according to the FIGS. 1 to 3 have in common is the behavior which results in a mode selection, in which optical path length within the resonator 2 is dispositive. The optical path length is a function of the temperature because during a temperature change, the geometrical conditions in the resonator 2 change according to the coefficients of thermal expansion of the media used and also the optical conditions change according to the temperature dependency of the refractive index of the media. Thus, a single-mode emission of the laser can only be achieved by adjusting the temperature of the media of the resonator 2. According to the invention, the temperature is varied until a resonator mode lies in the emission maximum of the amplification bandwidth. In this manner, an arrangement for stabilizing the optical path length of the laser resonator is formed. It is required here to create the tuning range of the temperature change wide enough so that at a given temperature increase, a corresponding frequency change towards the emission maximum is achieved.

Figure 4:
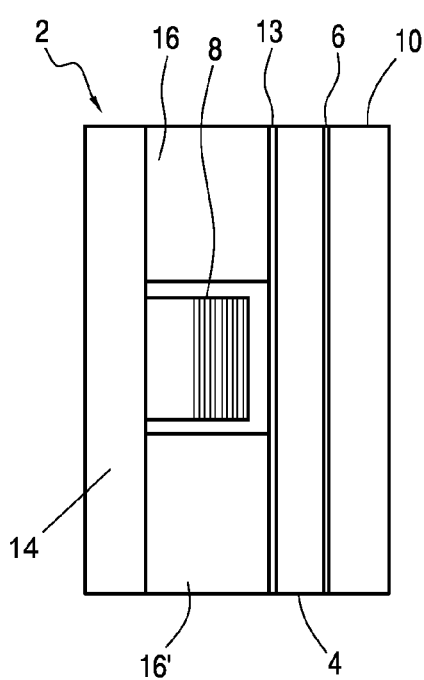
FIG. 4 shows, in the same manner as FIG. 1, a fourth embodiment of a laser according to the invention.

In FIG. 4, a fourth embodiment of a laser resonator 2 according to the invention is illustrated which differs from the embodiment according to FIG. 3 in that the saturable absorber mirror 8 is arranged on a carrier element 14, and between the carrier element 14 and the laser medium 4, two spacers 16, 16' are arranged. According to the invention, the material of the spacers 16, 16' is selected with respect to its coefficient of thermal expansion in such a manner that during a temperature change, the optical path length of the laser resonator 2 changes. Through appropriate selection of the coefficient of thermal expansion it is therefore possible to influence the optical path length of the laser resonator 2 via a temperature change in the desired manner.

If in the embodiment according to FIG. 4, the heat generated in the laser resonator 2, in particular in the laser medium 4, is dissipated via the carrier element 10, the spacers 16, 16' can consist of a thermally insulating material or a material with poor thermal conductivity. If generated heat in FIG. 4 has to be conducted to the left to be dissipated in this manner, the spacers 16, 16' can consist of a material with high thermal conductivity.

Figure 5:
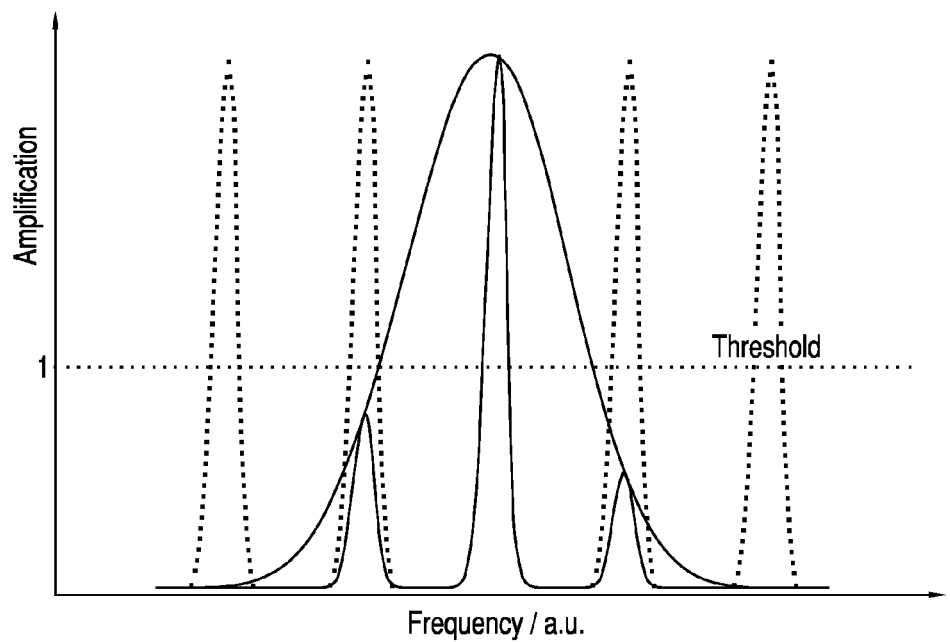
FIG. 5 shows a diagram for clarifying the dependency of the position of an oscillating laser mode within the amplification bandwidth.

FIG. 5 illustrates the dependency of the position of an oscillating laser mode within the amplification bandwidth. Here, only modes with an amplification >1, thus above the laser threshold, can oscillate. A change of the relative position of the modes within the emission spectrum by use of a temperature change makes it possible to induce the laser into a pulsed operation. According to the invention, the generation of short pulses is carried out by using a saturable absorber medium.

Figure 6:
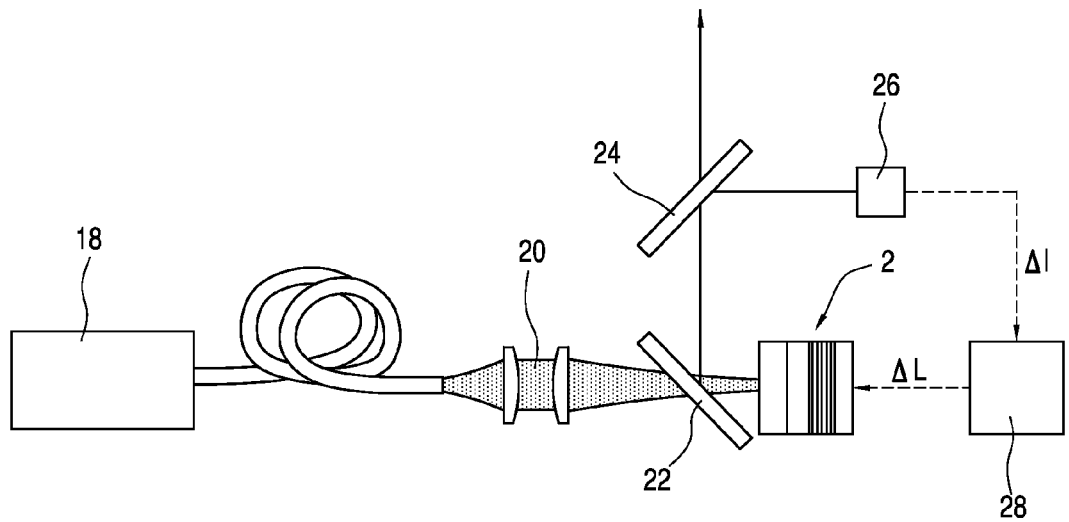
FIG. 6 shows a schematic block diagram of an arrangement for generating short laser pulses with a laser according to the invention.

FIG. 6 illustrates, greatly schematized, a laser arrangement according to the invention for generating short laser pulses. The laser resonator 2 is pumped here via a diode laser 18, the pump light of which is coupled into the resonator 2 via a telescope 20. A portion of the generated laser radiation reaches a photodiode 26 via a beam splitter 22, 24, and the photodiode generates an electric current which is proportional to the output power of the laser resonator 2. This signal is converted in a control device, such as a controller 28 into an actuating variable which influences the optical path length of the laser resonator as controlled variable. Actuating variables can be, for example, the pump diode current and/or the pump diode temperature of the diode laser 18, the temperature at a piezo element serving as spacer (cf. reference numbers 16, 16' in FIG. 4), or other parameters.

The invention provides a microcrystal laser by use of which, on the one hand, a monomode operation is achieved and, on the other hand, short laser pulses with low amplitude fluctuation can be generated.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. A microcrystal laser for generating laser pulses comprising:
   a laser resonator defined by first and second spaced apart mirrors, the first minor being a saturable absorber;
   a laser medium located between the first and second minors, and wherein an air gap is provided located within the laser resonator at a position between the first mirror and the laser medium and wherein second minor functions as the output coupler for the laser resonator and wherein the gain medium is excited by directing pump light through the first minor and wherein a coating is provided on one of (1) the side of the laser medium facing the saturable absorber or (2) the side of the saturable absorber facing the gain medium, said coating for reflecting pump light back into the gain medium;
   a support for carrying the first mirror and including a spacer coupled to said laser medium, said spacer spanning the air gap in a direction of an optical path length of the laser resonator, said spacer having a coefficient of thermal expansion selected so that when the microcrystal laser is heated, the spacer will expand at a rate that causes the width of the air gap to vary in a manner to adjust the optical path length of the laser resonator; and a control device for monitoring the output of the microcrystal laser and in response thereto varying the temperature of the microcrystal laser in order to vary the optical path length of the laser resonator.

2. The laser recited in claim 1 wherein the coefficient of thermal expansion of the spacer is higher than the coefficient of thermal expansion of the saturable absorber.

3. The laser recited in claim 1 further including a control device for controlling the optical path length of the laser resonator as a function of the output power of one of the microcrystal laser, the pulse repetition rate, and the wavelength of the laser mode.

4. The laser recited in claim 1, wherein the geometrical path length of the laser resonator is less than 500 μm.

5. The laser recited in claim 1, wherein the laser medium includes a side facing the saturable absorber medium; and wherein said coating for reflecting pump light back into the laser medium is provided on the side facing the saturable absorber medium.

* * * * *